June 25, 1935.  C. CHRISTIANSEN  2,005,911
BULL RAKE, LOADER AND LIFTER
Filed April 17, 1934  2 Sheets-Sheet 2
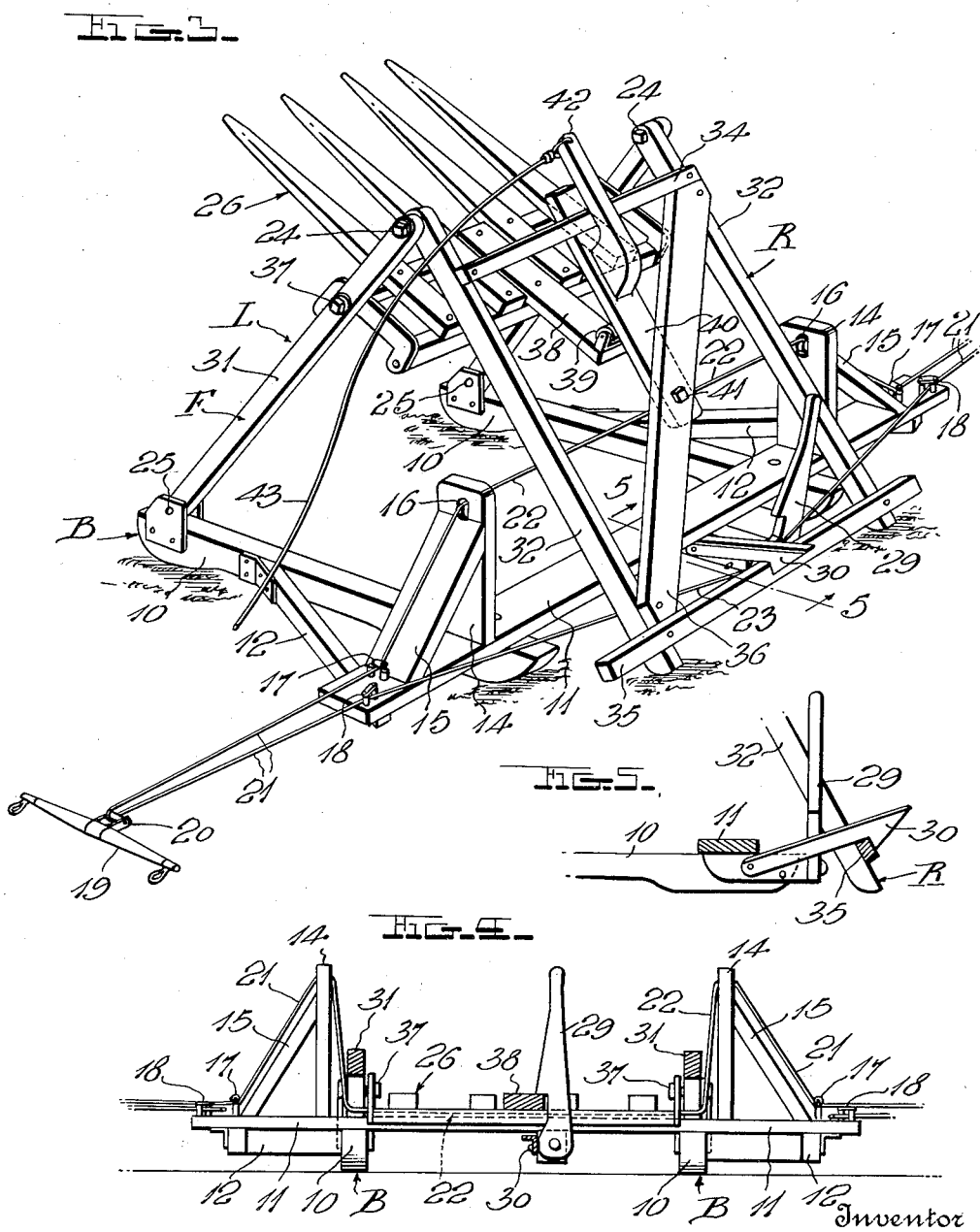

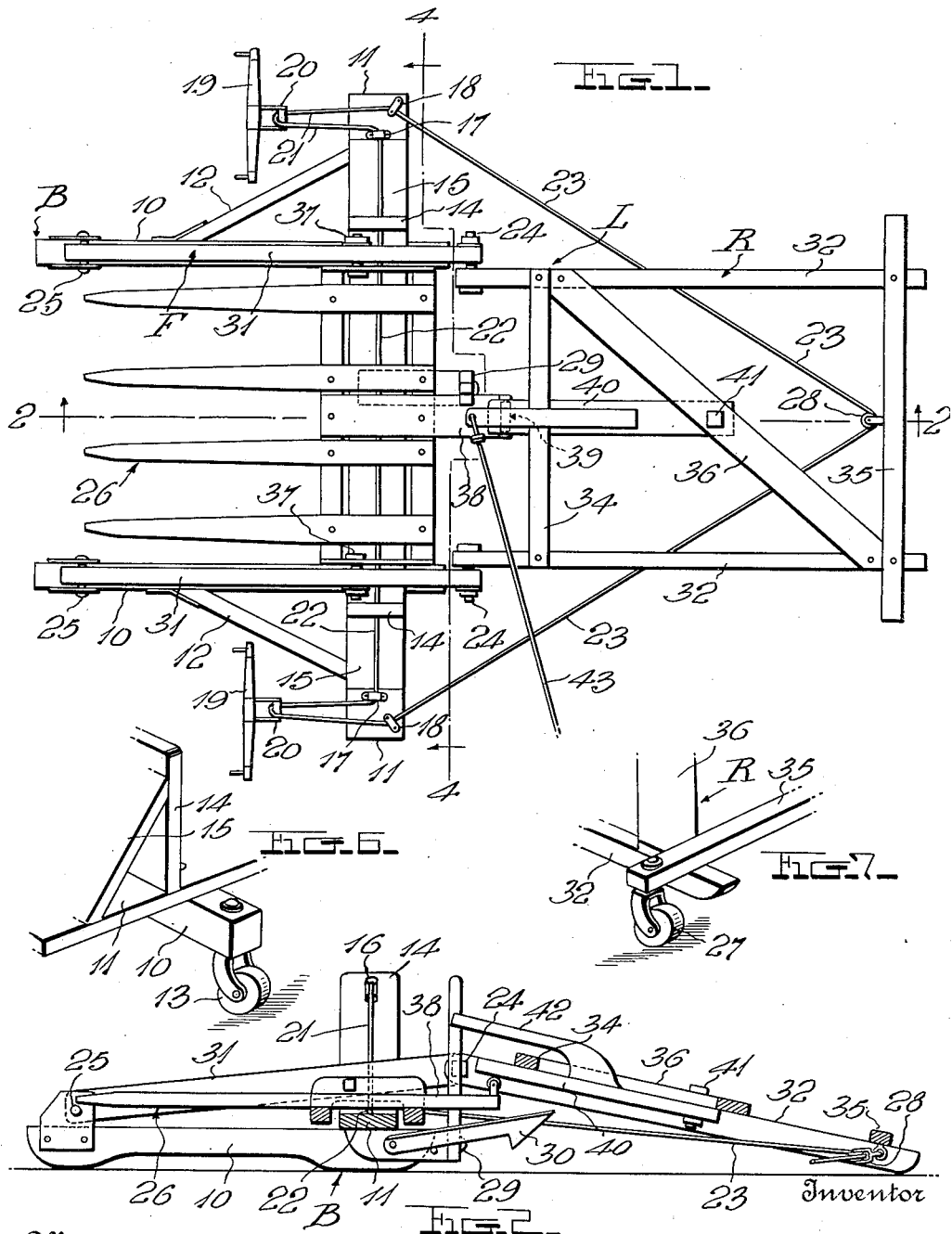

Patented June 25, 1935

2,005,911

UNITED STATES PATENT OFFICE 2,005,911

BULL RAKE, LOADER AND LIFTER

Christian Christiansen, Fargo, N. Dak.

Application April 17, 1934, Serial No. 721,032

9 Claims. (Cl. 214—140)

The invention relates to a new and improved machine designed primarily for lifting and carrying hay, and loading or stacking the same, although said machine may well be used for handling other materials and may, if desired, be provided with some other suitable form of load lifter instead of a load-lifting fork as herein disclosed. Reference to this fork and designation of the machine as a bull rake, are not therefore to be considered as limiting.

The principal object of the invention is to provide a machine of the class described which is pulled forwardly and engaged with the load by driving two draught animals forwardly, is then operated to lift the load by driving said animals laterally in opposite directions, and may then be forwardly pulled to carry the lifted load to any desired point, by again driving the animals forwardly.

A further object is to provide a machine in which simple, yet efficient provision is made for lifting the load with ease.

Another aim is to provide novel and advantageous means for holding the load-lifting fork against dumping until desired, and for then allowing said fork to dump.

Yet another aim is to provide a structure which will so equalize the pull of the two draught animals that neither can have any tendency to laterally move the entire machine when pulling laterally in opposite directions to lift the load.

With the foregoing in view, the invention resides in the novel subject matter hereinafter described and claimed, description being accomplished by reference to the accompanying drawings.

Fig. 1 is a top plan view showing the fork and its lifter in lowered position.

Fig. 2 is a vertical longitudinal sectional view substantially on line 2—2 of Fig. 1.

Fig. 3 is a perspective view showing the fork and its lifter in raised position.

Fig. 4 is a vertical transverse sectional view on line 4—4 of Fig. 1.

Fig. 5 is a detail vertical sectional view on line 5—5 of Fig. 3.

Figs. 6 and 7 are detail perspective views illustrating caster wheels which may be employed if desired.

One form of construction has been selected for illustration in the present disclosure and will be rather specifically described, with the understanding however, that variations may be made within the scope of the invention as claimed.

I provide a base B to be pulled along the ground. This base includes two parallel runners 10 suitably connected at their rear ends with a transverse bar 11 which projects laterally beyond said runners, the runners and bar being relatively braced as denoted at 12. If desired, the rear ends of the runners may be provided with caster wheels 13 as seen in Fig. 6 and in fact the entire base could be wheel-supported if desired. Two standards 14 are rigidly secured to and project upwardly from the laterally projecting ends of the transverse bar 11, suitable braces 15 being provided for said standards. At their upper ends, these standards are provided with cable guides 16, and the extremities of the bar 11 are each provided with two cable guides 17 and 18. Two singletrees 19, or other draught devices, are provided at opposite sides of the base B, and said draught devices are equipped with cable guides 20. Through all of the guides 16, 17, 18 and 20, an endless cable 21 is passed to serve as pull lines for pulling the entire machine forwardly when the draught animals are driven forwardly, and for operating the load-lifting means when the animals are driven laterally from the base. The cable 21 includes one reach 22 extending between the standards 14 and normally depressed as seen in Fig. 4, and said cable includes a rearwardly extending loop or reach 23, the relation of these cable portions with other parts of the machine being hereinafter described.

A fork lifter L is mounted upon the base B and comprises front and rear sections F and R pivoted together at 24, the front end of the front section F being pivotally mounted at 25 upon the front ends of the runners 10 while the rear end of the rear section R rests upon the ground and is capable of being moved forwardly so as to raise the connected ends of the two sections to lift the fork 26. If desired, the rear end of section R may be provided with caster wheels 27. A cable guide 28 is carried by this rear end of the section R, and the cable reach or loop 23 passes through this guide. When the lifting device L is lowered as seen in Fig. 2, the front section F rests upon the depressed cable reach 22 near the pivots 24, a suitable latch 29 being provided for holding said lifting device in lowered position while the machine is being pulled forwardly to engage the fork with the load to be lifted. After the fork has been engaged with the load, the latch 29 is released and the draught animals are driven laterally in opposite directions. They thus pull upon the cable 21 with the result that the reach 22 tends to rise and the reach 23 tends to move forwardly. Reach 22 therefore lifts the central portion of the load lifter L and at the same time the reach 23 pulls forwardly upon the rear end of the rear section R, the result being that the lifter L is easily and rapidly lifted to the position shown in Fig. 3. In this position, it may be held by a suitable latch 30 if the load is now to be carried upon the machine from one point to another. When the destination is reached, the fork 26 is allowed to dump, the latch 30 is released and the lifter L is restored to its normal position and held in such position by the latch 29.

Preferably, the load lifter L is constructed as shown, with the front section F formed from two longitudinal bars 31, and its rear section R constituted by two longitudinal bars 32, a front transverse bar 34, a rear transverse bar 35 and a diagonal brace bar 36, the adjacent ends of the bars 31 and 32 being connected by the pivots 24.

The fork 26 is pivotally mounted upon the front section F of the load lifter L as denoted at 37, the pivots being so located that the fork is forwardly over-balanced. This fork is provided with a rearwardly projecting arm 38 preferably having a roller 39 at its rear end, which end co-acts with a track 40 carried by the rear lifter section R for the purpose of holding the fork 26 against dumping while the load is being lifted. In the present showing, the track 40 is pivoted at 41 upon the brace bar 36 and extends under the front transverse bar 34, said track being provided with an arm 42 lying upon the upper side of said bar 34. To this arm, a rope or the like 43 is connected, and by pulling this rope, the track 40 may be swung from engagement with the arm 38, thereby allowing the fork 26 to dump.

With the lifter L held in lowered position by the latch 29, the draught animals may be driven forwardly to engage the fork 26 with the load. The latch 29 is then released and the draught animals are driven laterally in opposite directions so that they operate the cable 23 to raise the lifter L as above described. As soon as it is raised, the latch 30 engages the rear end of the section R to hold it in raised position. Ascent of the lifter L raises the fork 26 and its load, and the arm 38 and track 40 co-act in holding said fork against dumping. By now forwardly driving the draught animals, the entire machine is pulled to carry the load to the desired destination. By then pulling upon the rope or the like 43, track 40 is disengaged from arm 38 and the forwardly over-balanced fork 26 dumps the load. By backing the draught animals, the cable 21 is slackened, allowing re-lowering of the lifter L, re-engagement of the latch 30 to hold said lifter lowered, and re-engagement of the arm 38 with the track 40 to hold the fork 26 against dumping until next required.

While excellent results are obtainable from the construction shown and described, attention is again invited to the possibility of making variations.

I claim:

1. In a combined bull rake and load lifter, a base, a lifting fork mounted thereon, two draught devices at opposite sides of said base respectively, means operatively connecting said draught devices with said base and fork for pulling said base along the ground when said connecting means is pulled forwardly by said two draught devices, and for lifting said fork when the same connecting means is pulled laterally by the same two draught devices, and means for preventing lifting of said fork when said draught devices are pulled forwardly.

2. In a combined bull rake and load lifter, a base, a lifting fork mounted thereon, two draught devices at opposite sides of said base respectively, pull lines connected with said draught devices respectively, means operatively connecting said pull lines with said base and fork for pulling said base along the ground when said pull lines are pulled forwardly by said two draught devices, and for lifting said fork when the same pull lines are pulled laterally by the same two draught devices, and means for preventing lifting of said fork when said pull lines are pulled forwardly.

3. In a combined bull rake and load lifter, a base, a lifting fork mounted thereon, lifting means for said fork, two draught devices at opposite sides of said base, connecting means between said draught devices and said lifting means for operating the latter when said draught devices are pulled laterally from said base, and for pulling the base along the ground when said draught devices are forwardly pulled, and means for preventing operation of said lifting means when said draught devices are pulled forwardly.

4. In a combined bull rake and load lifter, a base, a lifting fork mounted thereon, lifting means for said fork, two draught devices at opposite sides of said base, pull lines operatively connected with said draught devices and said lifting means for operating the latter when said draught devices are pulled laterally from said base, and for pulling the base along the ground when said draught devices are forwardly pulled, and means for preventing operation of said lifting means when said draught devices are pulled forwardly.

5. A structure as specified in claim 4; said pull lines consisting of an endless cable slidably connected with said lifting means and with said draught devices to equalize the pull upon the latter.

6. In a combined bull rake and load lifter, a base, a fork lifter comprising front and rear sections pivoted together, the front end of said fork lifter being pivoted to said base, the rear end of the rear section of said fork lifter being forwardly movable to raise the pivotally connected ends of said front and rear sections, line guides on said base at opposite sides of said load lifter, two draught devices at opposite sides of said base, pull lines engaged with said guides, said pull lines being connected with the rear end of said rear section and with said draught devices for pulling said rear end of said rear section forwardly when said draught devices are pulled laterally from said base, and means for preventing operation of said fork lifter when desired, allowing use of said draught devices for forwardly pulling the base.

7. A structure as specified in claim 6; together with means for positioning a normally depressed reach of said pull lines under said fork lifter, whereby said reach will straighten and lift the pivotally connected ends of said sections when said draught devices are pulled laterally from the base.

8. In a combined bull rake and load lifter, a base, a fork lifter comprising front and rear sections pivoted together, the front end of said fork lifter being pivoted to said base, the rear end of the rear section of said fork lifter being forwardly movable to raise the pivotally connected ends of said front and rear sections, a cable guide on the rear end of said rear section, two standards rising from said base at opposite sides of said fork lifter, the upper ends of said standards being provided with cable guides, additional cable guides carried by said base at the lower ends of said standards, two draught devices at opposite sides of said base and each having a cable guide, an endless cable engaged with all of said guides, said cable having a front normally depressed reach between said standards and passing under said fork lifter, and further having a rear reach passing through the guide at the rear end of said rear section, whereby lateral pulling of said draught devices away from said base will operate said fork lifter, and means for holding said fork lifter against ascent when desired allowing the base to be forwardly pulled by said draught devices.

9. In a combine bull rake and load lifter, a base, a fork lifter comprising front and rear sections pivoted together, the front end of said fork lifter being pivoted to said base, the rear end of the rear section of said fork lifter being forwardly movable to raise the pivotally connected ends of said front and rear sections, means for forwardly moving said rear end of said rear section, a forwardly overbalanced fork pivotally mounted on said load lifter in advance of the pivotally connected ends of said sections, said fork having a rearwardly projecting arm, and a track carried by said rear section and engaging said arm to hold said fork against tilting while it is being lifted, said track being movable from engagement with said arm to allow the fork to dump.

CHRISTIAN CHRISTIANSEN.